(12) United States Patent
Ransom et al.

(10) Patent No.: US 8,288,887 B2
(45) Date of Patent: Oct. 16, 2012

(54) SYSTEMS AND METHODS FOR COMMUTATING INDUCTOR CURRENT USING A MATRIX CONVERTER

(75) Inventors: Ray M. Ransom, Big Bear City, CA (US); Lateef A. Kajouke, San Pedro, CA (US); Milun Perisic, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 187 days.

(21) Appl. No.: 12/622,088

(22) Filed: Nov. 19, 2009

(65) Prior Publication Data

US 2011/0115285 A1    May 19, 2011

(51) Int. Cl.
*B60L 1/00* (2006.01)
(52) U.S. Cl. ............ 307/9.1; 307/10.1; 363/95; 363/98; 363/131; 363/132
(58) Field of Classification Search .................. 307/9.1, 307/10.1; 363/95, 98, 131, 132
See application file for complete search history.

(56) References Cited

U.S. PATENT DOCUMENTS

| | | | |
|---|---|---|---|
| 5,461,297 A | 10/1995 | Crawford | |
| 5,545,971 A | 8/1996 | Gomez et al. | |
| 5,949,659 A | 9/1999 | Lesche | |
| 6,351,397 B1 | 2/2002 | Sawa et al. | |
| 6,538,909 B2 | 3/2003 | Goodarzi et al. | |
| 6,583,519 B2 | 6/2003 | Aberle et al. | |
| 6,989,613 B2 | 1/2006 | Andrews et al. | |
| 6,998,732 B2 | 2/2006 | Xing et al. | |
| 7,330,363 B2 | 2/2008 | Ponnaluri et al. | |
| 7,492,221 B2 | 2/2009 | Lawson et al. | |
| 7,599,204 B2 | 10/2009 | Kajouke et al. | |
| 7,679,941 B2 | 3/2010 | Raju et al. | |
| 7,764,527 B2 | 7/2010 | Takayanagi | |
| 2001/0012207 A1 | 8/2001 | Nomura | |
| 2001/0026427 A1* | 10/2001 | Mahlein et al. | ............... 361/91.1 |
| 2001/0036086 A1 | 11/2001 | Pascu et al. | |
| 2002/0044468 A1 | 4/2002 | Goodarzi et al. | |

(Continued)

FOREIGN PATENT DOCUMENTS

DE       102007040550 A1    3/2008

(Continued)

OTHER PUBLICATIONS

Kajouke, L.A., "Unity Power Factor Isolated Single Phase Matrix Converter Battery Charger," U.S. Appl. No. 12/413,181, filed Mar. 27, 2009.

(Continued)

*Primary Examiner* — Jared Fureman
*Assistant Examiner* — Alfonso Perez Borroto
(74) *Attorney, Agent, or Firm* — Ingrassia Fisher & Lorenz, P.C.

(57) ABSTRACT

Systems and methods are provided for delivering current using a matrix converter in a vehicle. An electrical system comprises an AC interface, a first conversion module coupled to the AC interface, an inductive element coupled between the AC interface and the first conversion module, and a control module coupled to the first conversion module. The control module is configured to operate the first conversion module in a bidirectional operating mode to commutate current bidirectionally. When a magnitude of the current through the inductive element is greater than a first threshold value, the control module operates the conversion module in a unidirectional operating mode, wherein current is commutated unidirectionally.

20 Claims, 5 Drawing Sheets

U.S. PATENT DOCUMENTS

| | | | |
|---|---|---|---|
| 2003/0102718 A1 | 6/2003 | Hockney et al. | |
| 2004/0026929 A1* | 2/2004 | Rebsdorf et al. | 290/44 |
| 2004/0066663 A1 | 4/2004 | Raichle | |
| 2004/0119449 A1 | 6/2004 | Matley | |
| 2007/0035265 A1* | 2/2007 | Balog et al. | 318/439 |
| 2007/0139975 A1 | 6/2007 | Yamauchi et al. | |
| 2007/0274109 A1* | 11/2007 | Oyobe et al. | 363/37 |
| 2008/0013351 A1 | 1/2008 | Alexander | |
| 2008/0055938 A1* | 3/2008 | Kajouke et al. | 363/13 |
| 2008/0055954 A1* | 3/2008 | Kajouke et al. | 363/159 |
| 2008/0130339 A1 | 6/2008 | McDonald et al. | |
| 2009/0251938 A1 | 10/2009 | Hallak | |

FOREIGN PATENT DOCUMENTS

| | | |
|---|---|---|
| GB | 2459542 A | 11/2009 |
| JP | 2008306855 A | 12/2008 |

OTHER PUBLICATIONS

Kajouke, L.A., "Systems and Methods for Bi-Directional Energy Delivery With Galvanic Isolation," U.S. Appl. No. 12/535,975, filed Aug. 5, 2009.

Kajouke, L.A., et al. "Charging System With Galvanic Isolation and Multiple Operating Modes," U.S. Appl. No. 12/535,994, filed Aug. 5, 2009.

Office Action, dated Oct. 5, 2011, for U.S. Appl. No. 12/413,181.

German Office Action, dated Mar. 21, 2012, for German Patent Application No. 10 2011 085 063.5.

Chu, Grace, et al., "A Unified Approach for the Derivation of Robust Control for Boost PFC Converters," IEEE Transactions on Power Electronics, Nov. 2009, pp. 2531-2544, vol. 24, Issue: 11.

German Office Action, dated Jan. 27, 2012, for German Patent Application No. 10 2010 031 615.6.

U.S. Office Action, dated Jan. 23, 2012, for U.S. Appl. No. 12/535,994.

Figueres, E., et al. "A Control Circuit With Load-Current Injection for Single-Phase Power-Factor-Correction Rectifiers," IEEE Transactions on Industrial Electronics, Jun. 2007, pp. 1272-1281, vol. 54, No. 3.

Prathapan, P.T., et al., "Feedforward Current Control of Boost-Derived Single-phase PFC Converters," IEEE Applied Power Electronics Conference and Exposition, Mar. 2005, pp. 1716-1722, vol. 3.

U.S. Office Action, dated Feb. 8, 2012, for U.S. Appl. No. 12/535,975.

Ransom, R.M., "Systems and Methods for Deactivating a Matrix Converter," U.S. Appl. No. 12/725,265, filed Mar. 16, 2010.

Kajouke, L.A., et al., "Systems and Methods for Reducing Transient Voltage Spikes in Matrix Converters," U.S. Appl. No. 12/839,134, filed Jul. 19, 2010.

Perisic, M., et al. "Compensation for Electrical Converter Nonlinearities," U.S. Appl. No. 12/941,552, filed Nov. 8, 2010.

Perisic, M., et al. "Systems and Methods for Providing Power to a Load Based Upon a Control Strategy," U.S. Appl. No. 12/949,439, filed Nov. 18, 2010.

Ransom, Ray., et al. "Systems and Methods for Initializing a Charging System," U.S. Appl. No. 13/149,484, filed May 31, 2011.

Perisic, M., et al. "Compensation for Electrical Converter Nonlinearities," U.S. Appl. No. 12/941,521, filed Nov. 8, 2010.

Kajouke, L.A., et al. "Systems and Methods for Reducing Harmonic Distortion in Electrical Converters," U.S. Appl. No. 12/941,488, filed Nov. 8, 2010.

Delorme, Gilles M., et al. "Methods and Systems for Controlling Vehicle Defrost Units," U.S. Appl. No. 12/871,664, filed Aug. 30, 2010.

Kajouke, L.A., et al. "Discharging a DC Bus Capacitor of an Electrical Converter System," U.S. Appl. No. 13/090,911, filed Apr. 20, 2011.

Perisic, M., et al. "Systems and Methods for Providing Power to a Load Based Upon a Control Strategy," U.S. Appl. No. 13/222,961, filed Aug. 31, 2011.

USPTO, U.S. "Final Office Action" mailed Jun. 28, 2012, for U.S. Appl. No. 12/535,994 filed Aug. 5, 2008.

USPTO, U.S. "Final Office Action" mailed May 10, 2012, for U.S. Appl. No. 12/413,181 filed Mar. 27, 2009.

Office Action, dated Jul. 23, 2012, for U.S. Appl. No. 12/725,265.

Final Office Action, dated Aug. 2, 2012, for U.S. Appl. No. 12/535,975.

\* cited by examiner

SYSTEMS AND METHODS FOR COMMUTATING INDUCTOR CURRENT USING A MATRIX CONVERTER

STATEMENT REGARDING FEDERALLY SPONSORED RESEARCH OR DEVELOPMENT

This invention was made with Government support under Agreement No. DE-FC26-07NT43123, awarded by the United States Department of Energy. The Government has certain rights in this invention.

TECHNICAL FIELD

Embodiments of the subject matter described herein relate generally to electrical systems in automotive vehicles, and more particularly, embodiments of the subject matter relate to bidirectional energy delivery systems with galvanic isolation.

BACKGROUND

Matrix converters (or cycloconverters) may be used in electric and/or hybrid vehicles to accommodate delivery of high power over wide range of operating input/output voltages, while at the same time achieving galvanic isolation, unity power factor, low harmonic distortion, high power density and low cost. Matrix converters may be used to deliver energy from an alternating current (AC) energy source, such as the single-phase grid electricity common in most residential and commercial buildings, to a direct current (DC) energy storage element, such as a rechargeable battery, in the vehicle. In addition, it is possible to operate the matrix converter to deliver energy from the DC energy storage element to an AC load. In some matrix converter systems, an inductor is present between the AC load and the matrix converter. It is desirable that the inductor current be commutated when the current through the inductor changes polarity to prevent undesirable and potentially damaging voltage spikes across components of the matrix converter. Therefore, many prior art systems utilize a snubber, which is an additional lossy component that must be added to the system.

BRIEF SUMMARY

In accordance with one embodiment, an electrical system for use in a vehicle is provided. The electrical system comprises an alternating current (AC) interface, a first conversion module coupled to the AC interface, an inductive element coupled between the AC interface and the first conversion module, and a control module coupled to the first conversion module. The control module is configured to operate the first conversion module in a bidirectional operating mode, wherein the first conversion module commutates current bidirectionally in the bidirectional operating mode. The control module is further configured to obtain a current through the inductive element, and when a magnitude of the current through the inductive element is greater than a first threshold value, operate the conversion module in a unidirectional operating mode, wherein the first conversion module commutates current unidirectionally in the unidirectional operating mode.

In accordance with another embodiment, a method is provided for controlling an electrical system including a first conversion module and an inductive element configured in series between the first conversion module and an AC interface. The method comprises delivering current from the first conversion module in a first direction in accordance with a first operating mode, wherein current through the inductive element is commutated bidirectionally through the first conversion module in the first operating mode, and when a magnitude of the current through the inductive element is greater than a first threshold value, delivering current from the first conversion module in the first direction in accordance with a second operating mode, wherein current through the inductive element is commutated unidirectionally through the first conversion module in the second operating mode.

In another embodiment, a method is provided for controlling an electrical system including a first conversion module and an inductor configured in series between the first conversion module and an AC interface. The method comprising delivering current from the first conversion module in a first direction in accordance with a first operating mode, wherein the first conversion module commutates current in the first direction in the first operating mode, and delivering current from the first conversion module in a second direction in accordance with a second operating mode, the second direction being opposite the first direction, wherein the first conversion module commutates current in the second direction in the second operating mode. The method further comprises transitioning between the first operating mode and the second operating mode when a magnitude of current through the inductor is less than a first threshold value, wherein the first conversion module is configured to commutate current bidirectionally while transitioning between the first operating mode and the second operating mode.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

For the sake of brevity, conventional techniques related to electrical energy and/or power conversion, electrical charging systems, power converters, pulse-width modulation (PWM), and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate generally to matrix converter systems capable of commutating current bidirectionally at or near the zero crossing of the inductor current to prevent undesirable transient voltage spikes when the inductor current changes direction while commutating current unidirectionally at higher values of the inductor current to improve the range of achievable duty cycles for the matrix converter. As used herein, commutating should be understood as the process of cycling the inductor current through switches and diodes of the matrix converter such that the flow of current through the inductor is not interrupted.

Figure 1:
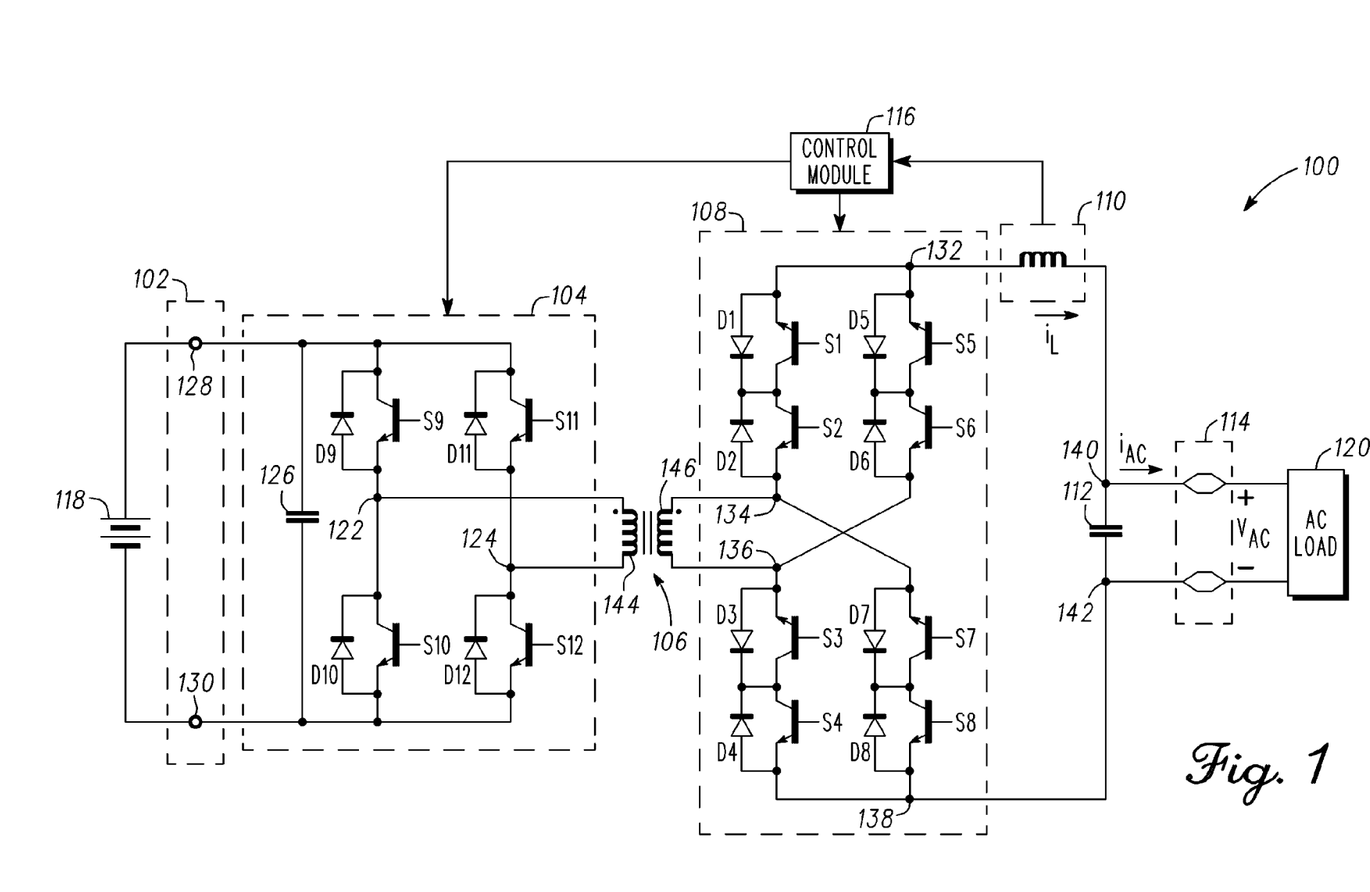
FIG. 1 is a schematic view of a electrical system suitable for use in a vehicle in accordance with one embodiment.

FIG. 1 depicts an exemplary embodiment of an electrical system 100 (or alternatively, a charging system, charger or charging module) suitable for use in a vehicle, such as, for example, an electric and/or hybrid vehicle. The electrical system 100 includes, without limitation, a first interface 102, a first bidirectional conversion module 104, an isolation module 106, a second bidirectional conversion module 108, an inductive element 110, a capacitive element 112, a second interface 114, and a control module 116. In an exemplary embodiment, the control module 116 is coupled to the bidirectional conversion modules 104, 108 and operates the bidirectional conversion modules 104, 108 in a manner that achieves a desired power flow to/from an energy source 118 coupled to the first interface 102 from/to a load 120 coupled to the second interface 114, as described in greater detail below.

It should be understood that FIG. 1 is a simplified representation of a electrical system 100 for purposes of explanation and is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner.

In an exemplary embodiment, the first interface 102 is coupled to the first bidirectional conversion module 104 which, in turn, is coupled to the isolation module 106. The isolation module 106 is coupled to the second bidirectional conversion module 108 which, in turn, is coupled to the AC interface 114 via the inductive element 110. In an exemplary embodiment, the control module 116 is coupled to the bidirectional conversion modules 104, 108 and is configured to obtain or otherwise monitor the current through the inductive element 110 ($i_L$), as described in greater detail below.

The first interface 102 generally represents the physical interface (e.g., terminals, connectors, and the like) for coupling the electrical system 100 to a DC energy source 118. The DC energy source 118 (or alternatively, the energy storage source or ESS) is capable of providing and/or receiving a direct current to/from the electrical system 100 at a particular DC voltage level. In accordance with one embodiment, the DC energy source 118 is a rechargeable high-voltage battery pack capable of storing regenerative energy. In other embodiments, the DC energy source 118 may comprise a battery, a fuel cell, an ultracapacitor, or another suitable energy storage device. In this regard, the DC energy source 118 may comprise the primary energy source for an electrical system and/or an electric motor in a vehicle. For example, the DC energy source 118 may be coupled to a power inverter coupled to the electric motor and configured to drive the electric motor via the power inverter. In an exemplary embodiment, the DC energy source 118 has a nominal DC voltage range from about 200 to 500 Volts DC.

Similarly, the second interface 114 generally represents the physical interface (e.g., terminals, connectors, and the like) for coupling the electrical system 100 to an AC load 120. The AC load 120 is capable of receiving an AC current ($i_{AC}$) from the electrical system 100 at a particular AC voltage level ($V_{AC}$).

In an exemplary embodiment, the first bidirectional conversion module 104 converts DC energy from the DC energy source 118 to high-frequency energy provided to the isolation module 106 at nodes 122, 124. In this regard, the first bidirectional conversion module 104 operates as an inverter. In the illustrated embodiment, the first bidirectional conversion module 104 comprises four switching elements (S9-S12) with each switching element having a diode (D9-D12) configured antiparallel to the respective switching element. As shown, the first bidirectional conversion module 104 also includes a capacitor 126 configured electrically in parallel across the DC interface 102 to reduce voltage ripple at the DC interface 102, as will be appreciated in the art.

In an exemplary embodiment, the switching elements (S9-S12) are transistors, and may be realized using any suitable semiconductor transistor switch, such as a bipolar junction transistor (e.g., an IGBT), a field-effect transistor (e.g., a MOSFET), or any other comparable device known in the art. The switches and diodes are antiparallel, meaning the switch and diode are electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 118 for charging the DC energy source 118 when the respective switch is off while the switches are modulated (e.g., opened and/or closed) to provide a path for current from the DC energy source 118 to the isolation module 106 for delivering (or uploading) energy to the AC load 120.

In the illustrated embodiment, switch S9 is connected between node 128 of the DC interface 102 and node 122 and configured to provide a path for current flow from node 128 to node 122 when switch S9 is closed. Diode D9 is connected between node 122 and node 128 and configured to provide a path for current flow from node 122 to node 128 (e.g., diode D9 is antiparallel to switch S9). Switch S10 is connected between node 130 of the DC interface 102 and node 122 and configured to provide a path for current flow from node 122 to node 130 when switch S10 is closed, while diode D10 is connected between node 122 and node 130 and configured to provide a path for current flow from node 130 to node 122. In a similar manner, switch S11 is connected between node 128 and node 124 and configured to provide a path for current flow from node 128 to node 124 when switch S11 is closed, diode D11 is connected between node 124 and the DC interface 102 and configured to provide a path for current flow from node 124 to node 128, switch S12 is connected between node 130 and node 124 and configured to provide a path for current flow from node 124 to node 130 when switch S12 is closed, and diode D12 is connected between node 124 and the DC interface 102 and configured to provide a path for current flow from node 130 to node 124.

In an exemplary embodiment, depending on the mode of operation, second bidirectional conversion module 108 facilitates the flow of current (or energy) to the AC load 120 from the isolation module 106. In the illustrated embodiment, the second bidirectional conversion module 108 is realized as a front end unity power factor single-phase matrix converter comprising eight switching elements (S1-S8) with each switching element having a diode (D1-D8) configured antiparallel to the respective switching element, in a similar manner as set forth above in regards to the first bidirectional conversion module 104. Accordingly, for convenience, but without limitation, the second bidirectional conversion module 108 may alternatively be referred to herein as a matrix conversion module (or matrix converter) or a cycloconverter.

In the illustrated embodiment of FIG. 1, a first set of switches (S1, S2) and diodes (D1, D2) are coupled between node 132 and node 134, with the first pair of switch and antiparallel diode (e.g., S1 and D1) being configured with opposite polarity as the second pair of switch and antiparallel diode (e.g., S2 and D2). In this manner, switch S1 and diode D2 are configured to provide a path for current flow from node 134 through switch S1 and diode D2 to node 132 when switch S1 is closed (or ON) and the voltage at node 134 is more positive than the voltage at node 132, and switch S2 and diode D1 are configured to provide a path for current flow from node 132 through switch S2 and diode D1 to node 134 when switch S2 is closed (or ON) and the voltage at node 132 is more positive than the voltage at node 134. In a similar manner, a second set of switches (S3, S4) and diodes (D3, D4) are coupled between node 136 and node 138, a third set of switches (S5, S6) and diodes (D5, D6) are coupled between node 132 and node 136, a fourth set of switches (S7, S8) and diodes (D7, D8) are coupled between node 134 and node 138. In an exemplary embodiment, the switches (S1-S8) of the matrix conversion module 108 are modulated in a manner such that the AC current ($i_{AC}$) flows in a desired direction.

In the illustrated embodiment of FIG. 1, pairs of switches form shoot-through pairs, that is, a pair of switches that short circuit node 134 and node 136 when both switches of the pair are closed (or ON). In this regard, switches S1 and S6 form a first shoot-through pair, switches S2 and S5 form a second shoot-through pair, switches S3 and S8 form a third shoot-through pair, and switches S4 and S7 form a fourth shoot-through pair. As used herein, dead time should be understood as referring to a fixed amount of time which a first switch of a shoot-through pair (e.g., switch S1) must be opened (or turned OFF) before the other switch of the shoot-through pair (e.g., switch S6) may be closed (or turned ON). In other words, dead time corresponds to the time between opening a first switch of a shoot-through pair and closing the second switch of the shoot-through pair. As described in greater detail below, overlap time should be understood as referring to a fixed amount of time used to accommodate soft switching to ensure the inductor current is not interrupted, that is, the time between closing (or turning ON) one switch that allows/commutates current in a particular direction and opening (or turning OFF) a second switch that allows/commutates current in the same direction. In the illustrated embodiment, switches S1, S3, S5, and S7 comprise a positive set of switches which enable current flow from the matrix conversion module 108 in a positive direction (i.e., $i_L \geq 0$) because each either allows current flow from the isolation module 106 (e.g., from node 134 or node 136) to node 132 or from node 138 to the isolation module 106 (e.g., to node 134 or node 136). Similarly, switches S2, S4, S6, and S8 comprise a negative set of switches that enable current flow from the matrix conversion module 108 in a negative direction (i.e., $i_L \leq 0$) because each either allows current flow from node 132 to the isolation module 106 or to node 138 from the isolation module 106.

In an exemplary embodiment, the inductive element 110 is realized as an inductor configured electrically in series between node 132 of the matrix conversion module 108 and a node 140 of the AC interface 112. The inductor 110 functions as a high-frequency inductive energy storage element during operation of the electrical system 100. The control module 116 is coupled to or otherwise configured to obtain the current ($i_L$) through the inductor 110 and operate the matrix conversion module 108 to commutate the current through the inductor 110 in an appropriate direction to prevent undesirable voltage spikes, as described in greater detail below. In an exemplary embodiment, the capacitive element 112 is realized as a capacitor coupled between node 140 and node 142 of the AC interface 114, and the capacitor 112 and inductor 110 are cooperatively configured to provide a high frequency filter, such that the frequency of the current ($i_{AC}$) flowing to the AC load 120 is substantially equal to the desired frequency of the AC load 120, as will be appreciated in the art. As described in greater detail below, during operation of the electrical system 100, the matrix conversion module 108 is operated to commutate current bidirectionally to prevent voltage spikes when the inductor current ($i_L$) changes direction (e.g., at or near the zero crossing of the inductor current).

In an exemplary embodiment, the isolation module 106 provides galvanic isolation between the two bidirectional conversion modules 104, 108. In the illustrated embodiment, the isolation module 106 is realized as a high-frequency transformer, that is, a transformer designed for a particular power level at a high-frequency, such as the switching frequency of the switches of the conversion modules 104, 108 (e.g., 50 kHz), such that the physical size of the transformer is reduced relative to a transformer designed for the same power level at a lower frequency (e.g., the mains frequency). In an exemplary embodiment, the isolation module 106 comprises a first set of windings 144 connected between nodes 122, 124 of the first bidirectional conversion module 104 and a second set of windings 146 connected between nodes 134, 136. For purposes of explanation, the windings 146 may be referred to herein as comprising the primary winding stage (or primary windings) and the sets of windings 144 may be referred to herein as comprising the secondary winding stage (or secondary windings). The windings 144, 146 provide inductive elements that are magnetically coupled in a conventional manner to form a transformer, as will be appreciated in the art.

The control module 116 generally represents the hardware, firmware and/or software configured to modulate the switches of the bidirectional conversion modules 104, 108 to achieve a desired power flow between the DC energy source 118 and the AC load 120, as described in greater detail below. The control module 116 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein. As described in greater detail below, in an exemplary embodiment, the control module 116 obtains or otherwise monitors the current through the inductor 110 ($i_L$), and determines the appropriate operating mode for the matrix conversion module 108 that achieves current flow in a desired direction through the inductor 110 while simultaneously commutating current in the appropriate direction(s) to prevent undesirable voltage spikes within the electrical system 100.

Figure 2:
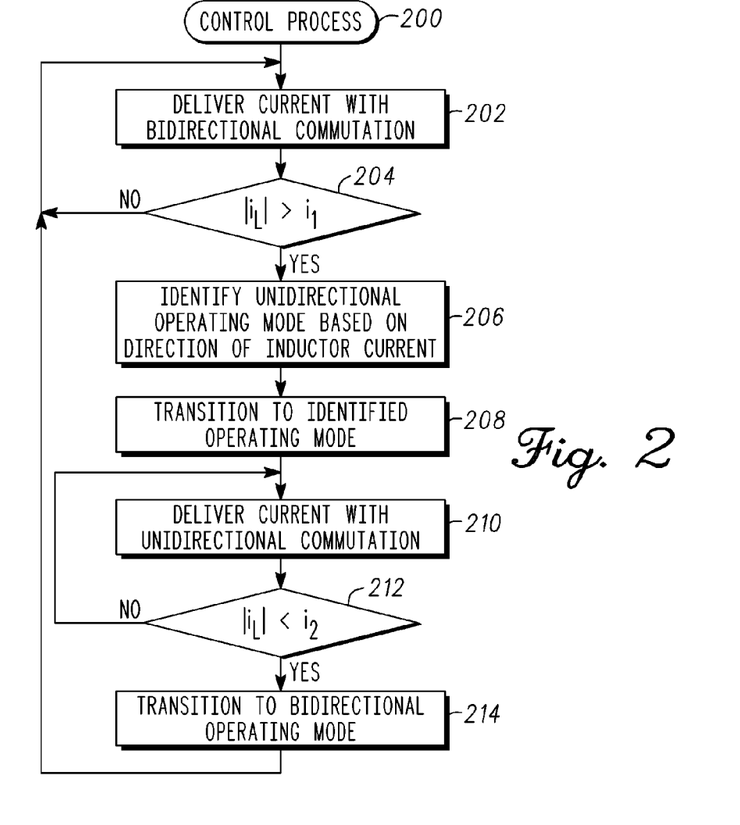
FIG. 2 is a flow diagram of control process suitable for use with the electrical system of FIG. 1 in accordance with one embodiment.

Referring now to FIG. 2, in an exemplary embodiment, an electrical system may be configured to perform a control process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the first bidirectional conversion module 104, the isolation module 106, the matrix conversion module 108, and/or the control module 116. It should be appreciated that any number of additional or alternative tasks may be included, and may be incorporated into a more comprehensive procedure or process having additional functionality not described in detail herein.

Referring to FIG. 2, and with continued reference to FIG. 1, a control process 200 may be performed to allow an electrical system 100 to deliver current in a desired direction to an AC energy load while commutating current to prevent undesirable voltage spikes within the electrical system 100. In an exemplary embodiment, the control process 200 begins by delivering current to the AC load in a desired direction using a matrix conversion module while commutating current bidirectionally through the matrix conversion module (task 202). In this regard, the control module 116 determines pulse-width modulated (PWM) signals that control the timing and duty cycles of the switching elements (S1-S8) of the matrix conversion module 108 such that current ($i_{AC}$) flows to/from the AC interface 114 in the desired direction while commutating the inductor current ($i_L$) bidirectionally through the matrix conversion module 108 to prevent transient voltage spikes.

Figure 3:
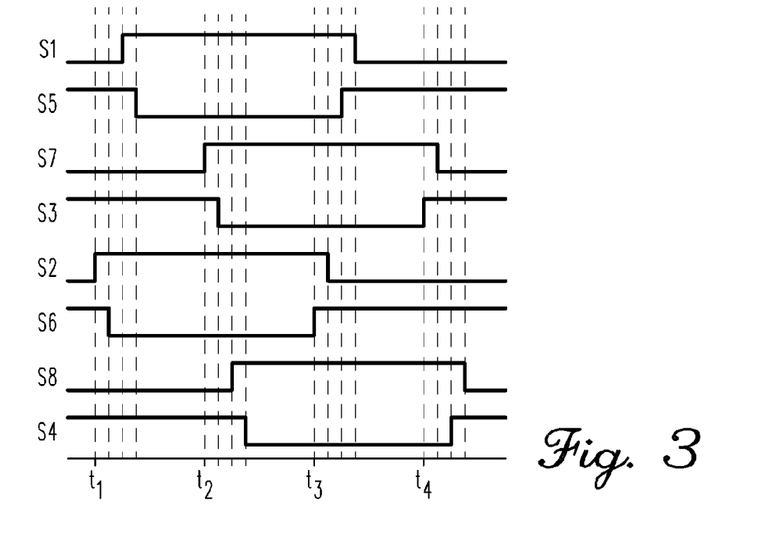
FIG. 3 is a timing diagram of a first bidirectional operating mode suitable for use with the control process of FIG. 2.

For example, FIG. 3 depicts an exemplary timing diagram for operating the switching elements (S1-S8) of the matrix conversion module 108 to deliver current in a positive direction (e.g., $i_L \geq 0$) while commutating the inductor current ($i_L$) bidirectionally (i.e., a positive bidirectional operating mode). In this regard, the control module 116 determines signals to modulate the switches (S9-S12) to produce a high-frequency voltage across nodes 122, 124, which is transferred to nodes 134, 136 via the isolation module 106, wherein FIG. 3 reflects the timing and duty cycles for switches (S1-S8) over one PWM cycle that corresponds to the period of the voltage across nodes 134, 136. In the illustrated embodiment, switches S3, S4, S5 and S6 are initially closed (or turned ON) to commutate the inductor current ($i_L$) bidirectionally, that is, in a positive direction through switches S3 and S5 and diodes D4 and D6 (e.g., current from node 132 through inductor 110 to node 138 to node 136) or in a negative direction through switches S4 and S6 and diodes D3 and D5 (e.g., current from node 138 through inductor 110 to node 132 to node 136). When the voltage at node 134 is more positive than the voltage at node 136, at some initial time during the PWM cycle ($t_1$), switch S2 is closed (or turned ON), and switch S6 is opened (or turned OFF) one overlap time after $t_1$. One dead time after switch S6 is opened, switch S1 is closed, and switch S5 is opened one overlap time after switch S1 is closed. As a result, two overlap times plus one dead time after $t_1$, switch S1 is closed to deliver current in the positive direction to node 132 from node 134 through switch S1 and diode D2 and S3 is closed to deliver current in the positive direction from node 138 to node 136 through switch S3 and diode D4, while switches S5 and S6 are in an open state to prevent commutation of the inductor current from node 132 to node 136. After delivering current in the positive direction for a desired amount of time, the control module 116 operates the matrix conversion module 108 to commutate current bidirectionally at time $t_2$. Switch S7 is closed at time $t_2$, switch S3 is opened one overlap time after closing switch S7, switch S8 is closed one dead time after switch S3 is opened, and switch S4 is opened one overlap time after switch S8 is closed. As a result, two overlap times plus one dead time after time $t_2$, switches S2 and S8 are closed to commutate the inductor current ($i_L$) in a negative direction through switches S2 and S8 and diodes D1 and D7 and switches S1 and S7 are closed to commutate the inductor current ($i_L$) in a positive direction through switches S1 and S7 and diodes D2 and D8.

After commutating current bidirectionally for a desired amount of time, the control module 116 operates the matrix conversion module 108 to deliver current in the positive direction at time $t_3$, at which time the voltage at node 136 is more positive than the voltage at node 134. At time $t_3$, switch S6 is closed, switch S2 is opened one overlap time after closing switch S6, and switch S5 is closed one dead time after switch S2 is opened, and switch S1 is opened one overlap time after switch S5 is closed. Thus, two overlap times plus one dead time after time $t_3$, switches S5 and S7 are closed to deliver current in a positive direction through switches S5 and S7 and diodes D6 and D8. After delivering current for a desired amount of time, the control module 116 operates the matrix conversion module 108 to commutate current bidirectionally at time $t_4$. At time $t_4$, switch S3 is closed, switch S7 is opened one overlap time after closing switch S3, switch S4 is closed one dead time after switch S7 is opened, and switch S8 is opened one overlap time after switch S4 is closed. Thus, two overlap times plus one dead time after time $t_4$, switches S3, S4, S5, and S6 are closed to commutate current bidirectionally, as described above. It will be appreciated in the art that the timing (i.e., $t_1$, $t_2$, $t_3$ and $t_4$) for when to commutate current and when to deliver current during the PWM cycle may be adjusted to achieve a desired power flow (i.e., a desired amount of current delivery), as will be appreciated in the art.

Figure 4:
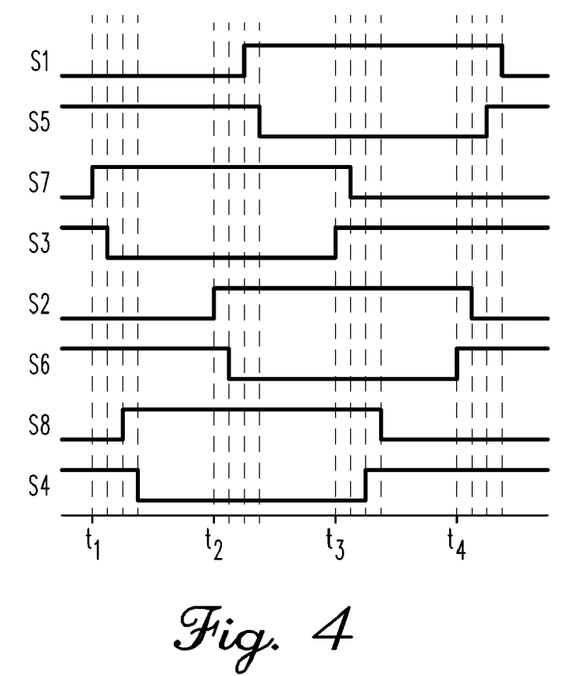
FIG. 4 is a timing diagram of a second bidirectional operating mode suitable for use with the control process of FIG. 2.

FIG. 4 depicts an exemplary timing diagram for operating the switching elements (S1-S8) of the matrix conversion module 108 to deliver current in a negative direction (e.g., $i_{AC}<0$) while commutating the inductor current ($i_L$) bidirectionally (i.e., a negative bidirectional operating mode). At time $t_1$, switch S7 is closed, switch S3 is opened one overlap time after switch S7 is closed, switch S8 is closed one dead time after switch S3 is opened, and switch S4 is opened one overlap time after switch S8 is closed, such that two overlap times plus one dead time after time $t_1$, current is delivered in a negative direction through switches S6 and S8 and diodes D5 and D7. After delivering current in the negative direction for a desired amount of time, at time $t_2$, switch S2 is closed, switch S6 is opened one overlap time after closing switch S2, and switch S1 is closed one dead time after switch S6 is opened, and switch S5 is opened one overlap time after switch S1 is closed. Thus, two overlap times plus one dead time after time $t_2$, switches S1, S2, S7 and S8 are closed to commutate the inductor current ($i_L$) bidirectionally. After commutating current bidirectionally for a desired amount of time, at time $t_3$, switch S3 is closed, switch S7 is opened one overlap time after closing switch S3, and switch S4 is closed one dead time after switch S7 is opened, and switch S8 is opened one overlap time after switch S4 is closed. Thus, two overlap times plus one dead time after time $t_3$, switches S2 and S4 are closed to deliver current in a negative direction. After delivering current for a desired amount of time, at time $t_4$, switch S6 is closed, switch S2 is opened one overlap time after closing switch S6, and switch S5 is closed one dead time after switch S2 is opened, and switch S1 is opened one overlap time after switch S5 is closed. Thus, two overlap times plus one dead time after time $t_4$, switches S3, S4, S5, and S6 are closed to commutate current bidirectionally, as described above.

Referring again to FIG. 2, in an exemplary embodiment, the control process 200 continues by obtaining or otherwise monitoring the current through the inductive element and determining or otherwise identifying when a magnitude of the current through the inductive element is greater than a first threshold value (task 204). In this regard, the first threshold value represents a magnitude of the current in a particular direction that indicates with sufficiently high likelihood that the current through the inductive element will not change direction during the next PWM cycle, that is, the current through the inductive element will remain in its present direction for at least the duration of the next PWM cycle, such that the matrix conversion module 108 does not need to commutate current bidirectionally. When the magnitude of the inductor current is less than the first threshold value (e.g., $|i_L|<i_1$), then the control module 116 operates the matrix conversion module 108 such that the inductor current is commutated bidirectionally due to the possibility or likelihood that the inductor current may change direction during the PWM cycle.

In an exemplary embodiment, in response to determining or otherwise identifying that the magnitude of the current through the inductive element is greater than the first threshold value, the control process 200 continues by identifying a unidirectional operating mode based on the direction of the current through the inductive element (task 206). In this regard, a unidirectional operating mode comprises an operating mode and/or control scheme for the switching elements (S1-S8) that results in current through the inductor in the appropriate direction but with unidirectional commutation. For example, if the inductor current is positive (e.g., $i_L>0$) and with a magnitude exceeding the first threshold value, the control module 116 may identify a positive operating mode which provides current in the positive direction while commutating the inductor current unidirectionally (i.e., in the positive direction). Conversely, when the inductor current is negative (e.g., $i_L<0$) and with a magnitude exceeding the first threshold value, the control module 116 may identify a negative operating mode which provides current in the negative direction while commutating the inductor current unidirectionally (i.e., in the negative direction).

Figure 5:
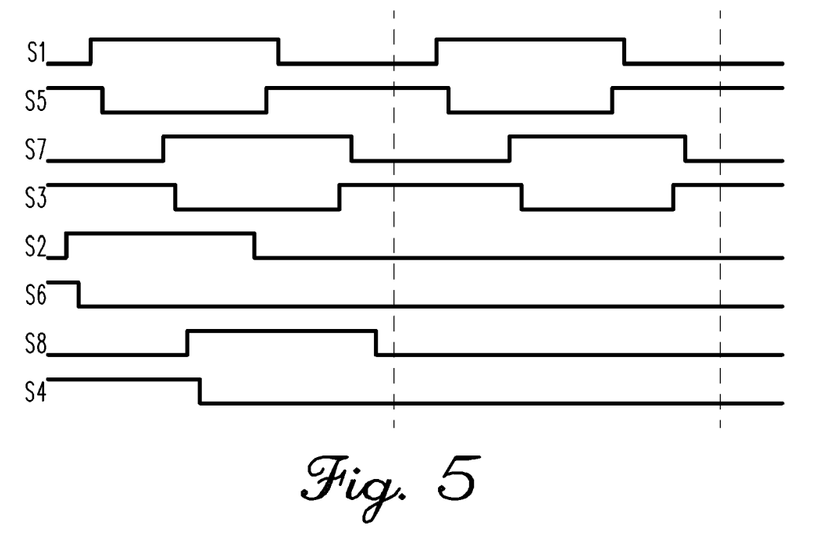
FIG. 5 is a timing diagram illustrating a transition from the first bidirectional operating mode of FIG. 3 to a unidirectional operating mode suitable for use with the control process of FIG. 2.

After identifying the desired unidirectional operating mode, in an exemplary embodiment, the control process 200 continues by transitioning the matrix conversion module to the identified operating mode (task 208). In this regard, the control module 116 modifies the PWM signals for operating the switching elements (S1-S8) of the matrix conversion module 108 during the current PWM cycle, such that the matrix conversion module may be operated in accordance with the identified unidirectional operating mode during the next PWM cycle. FIG. 5 depicts an exemplary timing diagram illustrating a transition from the positive bidirectional operating mode of FIG. 3 to a positive unidirectional operating mode. For example, referring now to FIG. 5 and with reference to FIG. 3, to transition from a positive bidirectional operating mode to a positive unidirectional operating mode, in an exemplary embodiment, the control module 116 is configured to open (or turn OFF) the negative switches (switches S2, S4, S6 and S8) during the current PWM cycle with their previously determined timing, and thereafter, maintain the negative switches (S2, S4, S6, S8) in an open state for the remainder of the current PWM cycle. For example, as shown in FIG. 5 relative to FIG. 3, once switch S6 is opened during the current PWM cycle, switch S6 is maintained in an open state and is not subsequently closed during the current PWM cycle.

Figure 6:
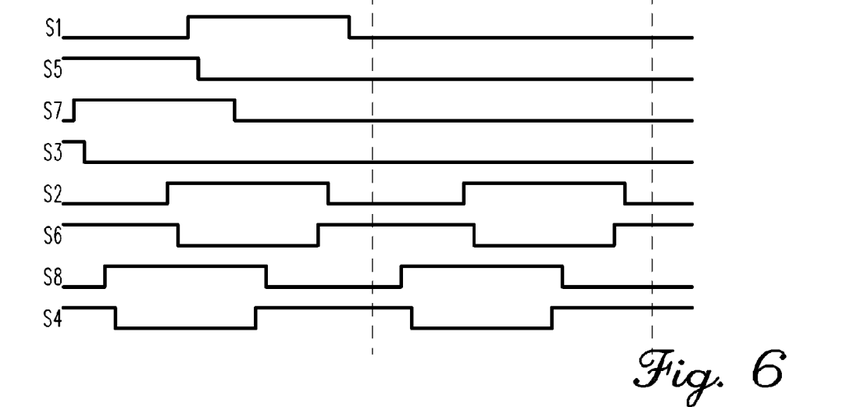
FIG. 6 is a timing diagram illustrating a transition from the second bidirectional operating mode of FIG. 4 to a unidirectional operating mode suitable for use with the control process of FIG. 2.

FIG. 6 depicts an exemplary timing diagram illustrating a transition from the negative bidirectional operating mode of FIG. 4 to a negative unidirectional operating mode. For example, referring now to FIG. 6 and with reference to FIG. 4, to transition from a negative bidirectional operating mode to a negative unidirectional operating mode, in an exemplary embodiment, the control module 116 is configured to open (or turn OFF) the positive switches (switches S1, S3, S5 and S7) during the current PWM cycle with their previously determined timing, and thereafter, maintain the positive switches (51, S3, S5, S7) in an open state for the remainder of the current PWM cycle. For example, as shown in FIG. 6 relative to FIG. 4, once switch S3 is opened during the current PWM cycle, switch S3 is not subsequently closed during the current PWM cycle, in contrast to the timing diagram of FIG. 4.

Referring again to FIG. 2, and with continued reference to FIG. 1 and FIGS. 3-6, in an exemplary embodiment, the control process 200 continues by delivering current in the appropriate direction with unidirectional current commutation by operating the matrix conversion module in accordance with the identified operating mode (task 210). In this regard, the control module 116 maintains switches of the matrix conversion module 108 that do not allow current flow in the direction of the identified operating mode in an open or turned OFF state. For example, for a positive unidirectional operating mode, the control module 116 maintains the negative switches (S2, S4, S6, S8) in an open (or OFF) state, because they do not allow current in a positive direction. Conversely, for a negative unidirectional operating mode, the control module 116 maintains positive switches (S1, S3, S5, S7) in an open (or OFF) state, because they do not allow current in a negative direction. In an exemplary embodiment, the control module 116 operates the remaining switches of the matrix conversion module 108 that allow current flow in the direction of the identified operating mode with timing and/or duty cycles to achieve a desired rate of energy delivery.

For example, as shown in FIG. 5, after transitioning to the positive unidirectional operating mode, the positive switches (51, S3, S5, S7) may be operated with the same duty cycles and timing as the positive bidirectional operating mode to deliver current in the positive direction as well as commutate the inductor current ($i_L$) in the positive direction (e.g., when switches S1 and S7 or switches S3 and S5 are simultaneously closed). In positive unidirectional operating mode, the amount of time required to transition from delivering current to commutating current corresponds to one overlap time, that is, the time interval between closing switch S1 and opening switch S5 or between closing switch S3 and opening switch S7. In contrast, as shown and described above in the context of FIG. 3, the amount of time required to transition from delivering current to commutating current in a bidirectional operating mode corresponds to two overlap times plus one dead time. This, in turn, limits the achievable effective duty cycle for delivering current (i.e., the amount of time devoted to delivering current) over a given PWM cycle. Accordingly, by operating the matrix conversion module 108 in a unidirectional operating mode, the effective duty cycle for delivering current (i.e., the amount of time devoted to delivering current) within a given PWM cycle may be increased beyond that which is achievable in the bidirectional operating mode. Additionally, switching losses that would otherwise occur from operating the negative switches (S2, S4, S6, S8) when delivering current in the positive direction are reduced or eliminated. Similarly, as shown in FIG. 6, the negative switches (S2, S4, S6, S8) may be operated with the same duty cycles and timing as the negative bidirectional operating mode as well as commutate the inductor current ($i_L$) in the negative direction (e.g., when switches S2 and S8 or switches S4 and S6 are simultaneously closed). As described above, the negative unidirectional operating mode accommodates an effective duty cycle for delivering current in the negative direction that is not achievable in the negative bidirectional operating mode.

Referring again to FIG. 2, in an exemplary embodiment, the control process 200 continues by obtaining the current through the inductive element and determining or otherwise identifying when a magnitude of the current through the inductive element is less than a second threshold value (task 212). In this regard, the second threshold value represents a magnitude of the current that indicates the current through the inductive element is sufficiently likely change direction during the next PWM cycle, that is, the current through the inductive element likely will not remain in the same direction for at least the duration of the next PWM cycle. Thus, a magnitude of the current through the inductive element that is less than the second threshold value indicates that the matrix conversion module 108 should be operated to commutate current bidirectionally so that the inductor current may be allowed to change direction without generating a relatively large transient voltage. In an exemplary embodiment, the second threshold value is less than the first threshold value (e.g., $i_2<i_1$) to provide hysteresis to ensure the electrical system does not alternate back and forth between a bidirectional mode and a unidirectional mode due to noise or fluctuations in the inductor current caused by switching. For example, in accordance with one embodiment, the second threshold value is about 2.75 amperes and the first threshold value is about 4 amperes.

In an exemplary embodiment, in response to determining or otherwise identifying that the magnitude of the current through the inductive element is less than the second threshold value, the control process 200 continues by transitioning to a bidirectional operating mode to provide current in the same direction as the current through the inductive element while commutating current bidirectionally (task 214). In this regard, the control module 116 modifies the PWM signals for operating the switching elements (S1-S8) of the matrix conversion module 108 during the current PWM cycle, such that the matrix conversion module 108 is capable of commutating current bidirectionally before the beginning of the next PWM cycle (or alternatively, by the end of the current PWM cycle).

Figure 7:
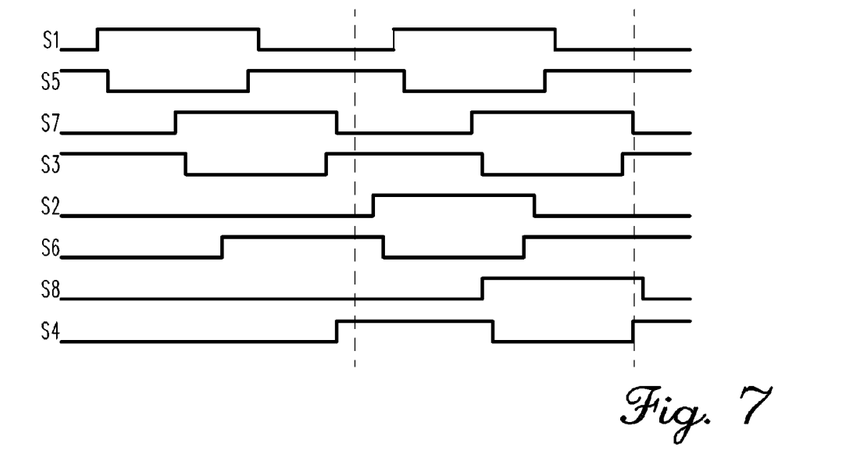
FIG. 7 is a timing diagram illustrating a transition from the unidirectional operating mode of FIG. 5 to the bidirectional operating mode of FIG. 3 suitable for use with the control process of FIG. 2.

FIG. 7 depicts an exemplary timing diagram illustrating a transition from the positive unidirectional operating mode to the positive bidirectional operating mode of FIG. 3. As described above, during the positive unidirectional operating mode, the negative switches (S2, S4, S6, S8) are maintained in an open (or OFF) state. To transition to the positive bidirectional operating mode, the control module 116 determines or otherwise generates PWM signals to close (or turn ON) switch S6 one dead time plus one overlap time prior to turning on switch S5 in the current PWM cycle and to close (or turn ON) switch S4 one dead time after switch S7 is opened. As a result, after switch S7 is opened, switches S4 and S6 are both closed to allow the inductor current to be commutated in the negative direction while S3 and S5 are both closed to allow the inductor current to be commutated in the positive direction. Thus, the matrix conversion module 108 provides bidirectional commutation of the inductor current prior to beginning the bidirectional positive operating mode at the end of the current PWM cycle.

Figure 8:
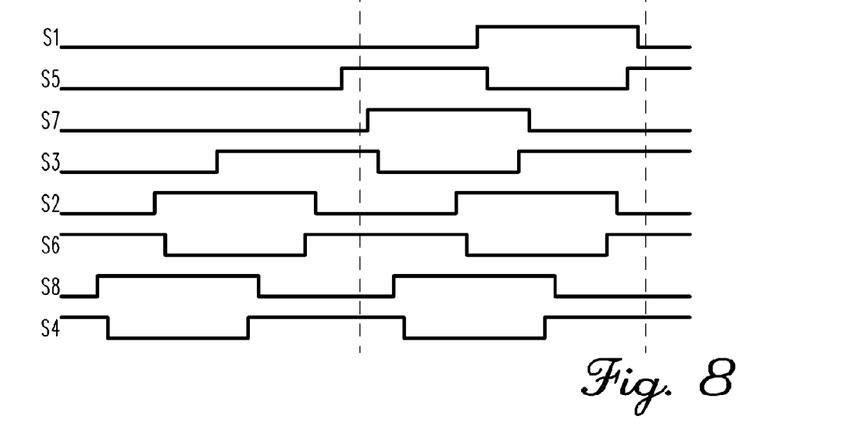
FIG. 8 is a timing diagram illustrating a transition from the unidirectional operating mode of FIG. 6 to the bidirectional operating mode of FIG. 4 suitable for use with the control process of FIG. 2.

FIG. 8 depicts an exemplary timing diagram illustrating a transition from the negative unidirectional operating mode to the negative bidirectional operating mode of FIG. 4. As described above, during the negative unidirectional operating mode, the positive switches (S1, S3, S5, S7) are maintained in an open (or OFF) state. To transition to the negative bidirectional operating mode, the control module 116 determines or otherwise generates PWM signals to close (or turn ON) switch S3 one dead time plus one overlap time prior to turning on switch S4 in the current PWM cycle and to close (or turn ON) switch S5 one dead time after switch S2 is opened. As a result, one dead time after switch S2 is opened, switches S4 and S6 are both closed to allow the inductor current to be commutated in the negative direction while S3 and S5 are both closed to allow the inductor current to be commutated in the positive direction. Thus, the matrix conversion module 108 provides bidirectional commutation of the inductor current prior to beginning the bidirectional negative operating mode.

After transitioning to a bidirectional operating mode, the control process 200 continues by delivering current in the desired direction while providing bidirectional commutation (task 202), as described above. In this regard, the control module 116 may periodically obtain the inductor current and change from a negative bidirectional operating mode to a positive bidirectional operating mode, or vice versa, whenever the inductor current crosses zero or otherwise changes direction. The loop defined by tasks 202, 204, 206, 208, 210, 212 and 214 may repeat as desired throughout operation. In this manner, when the current through the inductor approaches the zero crossing, the control module 116 operates the matrix conversion module 108 to commutate the inductor current bidirectionally to allow the inductor current to smoothly change direction without producing excessively large voltage spikes. For example, once the inductor current increases definitively in a positive direction (e.g., $|i_L|>i_1$), the control module 116 operates the matrix conversion module 108 in the positive unidirectional operating mode to deliver and commutate current in the positive direction. By virtue of maintaining the negative switches of the matrix conversion module 108 in an opened state in the positive unidirectional operating mode, the number of required dead times and/or overlap times that must be observed during a given PWM cycle are reduced, thereby allowing the ratio of the time during which the matrix conversion module 108 is delivering current and/or energy to the total time for the PWM cycle to be increased. When a magnitude of the inductor current falls below a threshold value (e.g., $|i_L|<i_2$) while in the positive unidirectional operating mode, the control module 116 transitions between the positive unidirectional operating mode and the negative unidirectional operating mode by operating the control module 116 in a bidirectional operating mode to commutate current bidirectionally. Once the inductor current increases definitively in the negative direction (e.g., $|i_L|>i_1$), the control module 116 operates the matrix conversion module 108 in the negative unidirectional operating mode to deliver and commutate current in the negative direction until the magnitude of the inductor current falls below a threshold value (e.g., $|i_L|<i_2$) while in the negative unidirectional operating mode, at which point, the control module 116 operates the matrix conversion module 108 in a bidirectional operating mode in order to transition to the positive unidirectional operating mode.

Figure 9:
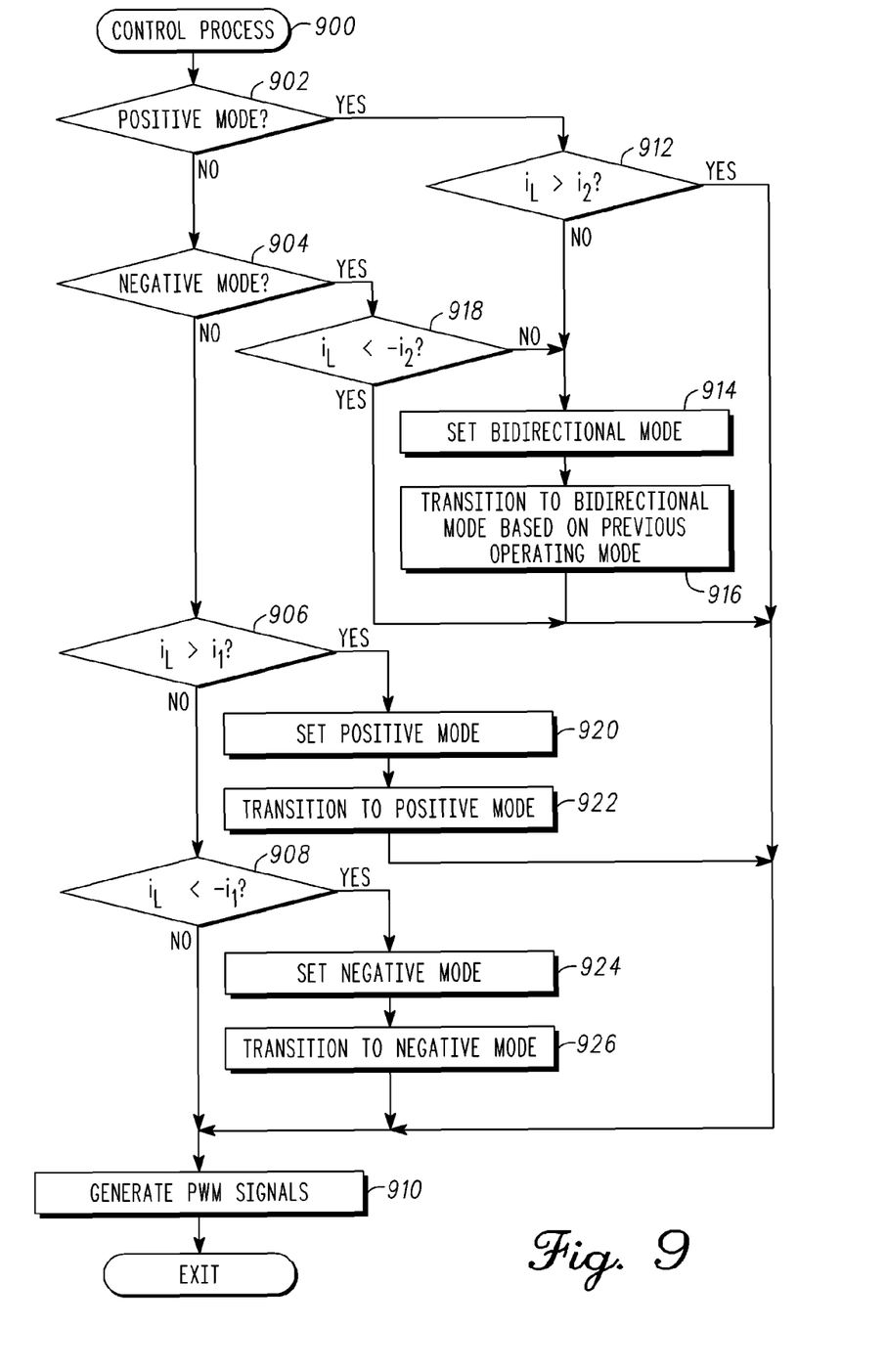
FIG. 9 is a flow diagram of control process suitable for use with the electrical system of FIG. 1 in accordance with one embodiment.

Referring now to FIG. 9, in accordance with one embodiment, a control module 116 may be configured to perform a control process 900 and additional tasks, functions, and operations described below in response to an interrupt request. In an exemplary embodiment, the interrupt request is generated or otherwise received by the control module 116 at fixed regular intervals. For example, in accordance with one embodiment, the control module 116 receives an interrupt signal every twenty milliseconds that causes the control module 116 to execute the control process 900. The control process 900 begins by determining or otherwise identifying whether the operating mode for the current PWM cycle corresponds to the positive unidirectional operating mode (task 902). If the operating mode for the current PWM cycle corresponds to the positive unidirectional operating mode, the control module 116 determines whether the magnitude of the inductor current in the positive direction is greater than the second threshold value (task 912), in a similar manner as described above in the context of FIG. 2. If the magnitude of the inductor current in the positive direction is greater than the second threshold value, the control module 116 generates PWM signals for the next PWM cycle in accordance with the positive unidirectional operating mode in a conventional manner as described above (task 910). If the magnitude of the inductor current in the positive direction is less than the second threshold value, the control module 116 sets the bidirectional operating mode as the operating mode for the next PWM cycle and transitions to the bidirectional operating mode from the positive unidirectional operating mode (tasks 914, 916). As described above, to transition to the positive bidirectional operating mode, the control module 116 determines or otherwise generates PWM signals to close (or turn ON) switch S6 one dead time plus one overlap time prior to turning on switch S5 in the current PWM cycle and to close (or turn ON) switch S4 one dead time after switch S7 is opened. The control process 900 continues by generating PWM signals for the next PWM cycle in accordance with the bidirectional operating mode (task 910).

If the operating mode for the current PWM cycle does not correspond to the negative unidirectional operating mode, the control module 116 continues by determining or otherwise identifying whether the operating mode for the current PWM cycle corresponds to the negative unidirectional operating mode (task 904). If the operating mode for the current PWM cycle corresponds to the negative unidirectional operating mode, the control module 116 determines whether the magnitude of the inductor current in the negative direction is greater than the second threshold value (task 918). If the magnitude of the inductor current in the negative direction is greater than the second threshold value, the control module 116 generates PWM signals for the next PWM cycle in accordance with the negative unidirectional operating mode (task 910). If the magnitude of the inductor current is less than the second threshold value, the control module 116 sets the bidirectional operating mode as the operating mode for the next PWM cycle and transitions to the bidirectional operating mode from the negative unidirectional operating mode (tasks 914, 916). As described above, to transition to the negative bidirectional operating mode, the control module 116 determines or otherwise generates PWM signals to close (or turn ON) switch S3 one dead time plus one overlap time prior to turning on switch S4 in the current PWM cycle and to close (or turn ON) switch S5 one dead time after switch S2 is opened. The control process 900 continues by generating PWM signals for the next PWM cycle in accordance with the bidirectional operating mode (task 910).

If the operating mode for the current PWM cycle does not correspond to a unidirectional operating mode, the control module 116 continues by determining or otherwise identifying whether magnitude of the inductor current is greater than the first threshold value in either the positive direction or the negative direction (tasks 906, 908). If the magnitude of the inductor current is greater than the first threshold value in the positive direction, the control module 116 sets the positive unidirectional operating mode as the operating mode for the next PWM cycle and transitions from the bidirectional operating mode to the positive unidirectional operating mode (tasks 920, 922). As described above, the control module 116 transitions to the positive unidirectional operating mode by opening (or turning OFF) the negative switches (switches S2, S4, S6 and S8) during the current PWM cycle with their previously determined timing, and thereafter, maintaining the negative switches (S2, S4, S6, S8) in an open state for the remainder of the current PWM cycle. The control process 900 continues by generating PWM signals for the next PWM cycle in accordance with the positive unidirectional operating mode (task 910). If the magnitude of the inductor current is greater than the first threshold value in the negative direction, the control module 116 sets the negative unidirectional operating mode as the operating mode for the next PWM cycle and transitions from the bidirectional operating mode to the negative unidirectional operating mode (tasks 924, 926). As described above, the control module 116 transitions to the negative unidirectional operating mode by opening (or turning OFF) the positive switches (switches S1, S3, S5 and S7) during the current PWM cycle with their previously determined timing, and thereafter, maintaining the positive switches (51, S3, S5, S7) in an open state for the remainder of the current PWM cycle. The control process 900 continues by generating PWM signals for the next PWM cycle in accordance with the negative unidirectional operating mode (task 910). When the magnitude of the inductor current is less than the first threshold value in either direction, the control process 900 sets the bidirectional operating mode as the operating mode for the next PWM cycle and generates PWM signals for the next PWM cycle in accordance with the bidirectional operating mode (task 910).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical system for use in a vehicle comprising:
an alternating current (AC) interface;
a first conversion module coupled to the AC interface;
an inductive element coupled between the AC interface and the first conversion module; and
a control module coupled to the first conversion module, wherein the control module is configured to:
operate the first conversion module in a bidirectional operating mode to deliver current to the AC interface in a first direction, wherein the first conversion module commutates a current through the inductive element bidirectionally in the bidirectional operating mode;
obtain the current through the inductive element; and
when a magnitude of the current through the inductive element in the first direction is greater than a first threshold value, operate the conversion module in a unidirectional operating mode to deliver current to the AC interface in the first direction, wherein the first conversion module commutates the current through the inductive element unidirectionally in the first direction in the unidirectional operating mode.

2. The electrical system of claim 1, wherein the control module is configured to identify a direction of the current through the inductive element, wherein the control module is configured to:
operate the conversion module in the unidirectional operating mode when the direction of the current through the inductive element corresponds to the first direction and the magnitude of the current through the inductive element in the first direction is greater than the first threshold value; and
operate the conversion module in a second unidirectional operating mode when the direction of the current through the inductive element corresponds to a second direction and the magnitude of the current through the inductive element in the second direction is greater than the first threshold value, the second direction being opposite the first direction.

3. The electrical system of claim 2, wherein:
the current through the inductive element is commutated through the first conversion module in the second direction during the second unidirectional operating mode; and
the current through the inductive element is commutated through the first conversion module in the first direction or the second direction during the bidirectional operating mode.

4. The electrical system of claim 1, wherein the first conversion module comprises:
a first set of switches configured to allow current through the inductive element in the first direction; and
a second set of switches configured to allow current through the inductive element in a second direction.

5. The electrical system of claim 4, wherein the control module is configured to:
operate the first set of switches and the second set of switches in the bidirectional operating mode; and
operate the first set of switches in the unidirectional operating mode.

6. An electrical system for use in a vehicle comprising:
an alternating current (AC) interface;
a first conversion module coupled to the AC interface, wherein the first conversion module comprises:
a first node coupled to the inductive element;
a second node coupled to the AC interface;
a third node;
a fourth node;
a first switch coupled between the first node and the third node, the first switch being configured to allow current from the third node to the first node when the first switch is closed;
a second switch coupled between the first switch and the third node, the second switch being configured to allow current from the first node to the third node when the second switch is closed;
a third switch coupled between the first node and the fourth node, the third switch being configured to allow current from the fourth node to the first node when the third switch is closed;
a fourth switch coupled between the third switch and the fourth node, the fourth switch being configured to allow current from the first node to the fourth node when the fourth switch is closed;
a fifth switch coupled between the second node and the fourth node, the fifth switch being configured to allow current from the second node to the fourth node when the fifth switch is closed;

a sixth switch coupled between the fifth switch and the second node, the sixth switch being configured to allow current from the fourth node to the second node when the sixth switch is closed;

a seventh switch coupled between the second node and the third node, the seventh switch being configured to allow current from the second node to the third node when the seventh switch is closed; and an eighth switch coupled between the seventh switch and the second node, the eighth switch being configured to allow current from the third node to the second node when the eighth switch is closed;

an inductive element coupled between the AC interface and the first conversion module; and a control module coupled to the first conversion module, wherein the control module is configured to:

operate the first conversion module in a bidirectional operating mode, wherein the first conversion module commutates current bidirectionally in the bidirectional operating mode;

obtain a current through the inductive element; and when a magnitude of the current through the inductive element is greater than a first threshold value, operate the conversion module in a unidirectional operating mode, wherein the first conversion module commutates current unidirectionally in the unidirectional operating mode.

7. The electrical system of claim 6, wherein the control module is configured to operate the first conversion module in the unidirectional operating mode by:

opening the second switch, the fourth switch, the sixth switch, and the eighth switch; and operating the first switch, the third switch, the fifth switch, and the seventh switch to deliver and/or commutate current in a first direction.

8. The electrical system of claim 6, wherein the control module is configured to operate the first conversion module in the unidirectional operating mode by:

opening the first switch, the third switch, the fifth switch, and the seventh switch; and operating the second switch, the fourth switch, the sixth switch, and the eighth switch to deliver and/or commutate current in a first direction.

9. The electrical system of claim 1, wherein when the magnitude of the current through the inductive element is less than a second threshold value in the unidirectional operating mode, the control module is configured to operate the conversion module in the bidirectional operating mode.

10. The electrical system of claim 9, wherein the control module is configured to transition from the unidirectional operating mode to the bidirectional operating mode, such that the first conversion module commutates current bidirectionally while being operated in the unidirectional operating mode.

11. The electrical system of claim 1, further comprising:

a second conversion module; and an isolation module coupled between the first conversion module and the second conversion module, the isolation module providing galvanic isolation between the first conversion module and the second conversion module.

12. A method for controlling an electrical system including a first conversion module and an inductive element configured in series between the first conversion module and an AC interface, the method comprising:

delivering current from the first conversion module to the AC interface in a first direction in accordance with a first operating mode, wherein current through the inductive element is commutated bidirectionally through the first conversion module in the first operating mode; and when a magnitude of the current through the inductive element is greater than a first threshold value, delivering current from the first conversion module to the AC interface in the first direction in accordance with a second operating mode, wherein current through the inductive element is commutated unidirectionally through the first conversion module in the second operating mode.

13. The method of claim 12, further comprising, when a magnitude of the current through the inductive element is less than a second threshold value while in the second operating mode, delivering current from the first conversion module in the first direction in accordance with the first operating mode.

14. The method of claim 13, further comprising transitioning to the first operating mode by commutating current bidirectionally while delivering current from the first conversion module in accordance with the second operating mode.

15. The method of claim 12, the first conversion module comprising a first set of switches configured to allow current in the first direction and a second set of switches configured to allow current in a second direction, the second direction being opposite the first direction, wherein:

delivering current from the first conversion module in accordance with the first operating mode comprises:

operating the first set of switches to deliver current in the first direction;

operating the first set of switches to commutate current in the first direction; and operating the second set of switches to commutate current in the second direction; and delivering current from the first conversion module in accordance with the second operating mode comprises:

operating the first set of switches to deliver current in the first direction;

operating the first set of switches to commutate current in the first direction; and opening the second set of switches.

16. A method for controlling an electrical system including a first conversion module and an inductor configured in series between the first conversion module and an AC interface, the inductor having an inductor current flowing through the inductor, the method comprising:

delivering current from the first conversion module in a first direction in accordance with a first operating mode, wherein the first conversion module commutates the inductor current in the first direction in the first operating mode;

delivering current from the first conversion module in a second direction in accordance with a second operating mode, the second direction being opposite the first direction, wherein the first conversion module commutates the inductor current in the second direction in the second operating mode; and when a magnitude of the inductor current is less than a first threshold value, transitioning between the first operating mode and the second operating mode, wherein the first conversion module is configured to deliver current in either the first direction or the second direction and commutate the inductor current bidirectionally while transitioning between the first operating mode and the second operating mode.

17. The method of claim 16, the first conversion module comprising a first set of switches corresponding to the first direction and a second set of switches corresponding to the second direction, wherein:

delivering current from the first conversion module in the first direction comprises:
- operating the first set of switches to deliver current in the first direction; and
- opening the second set of switches;

delivering current from the first conversion module in the second direction comprises:
- operating the second set of switches to deliver current in the second direction; and
- opening the first set of switches; and transitioning between the first operating mode and the second operating mode comprises operating the first set of switches and the second set of switches to commutate the inductor current bidirectionally.

18. The method of claim 17, wherein transitioning between the first operating mode and the second operating mode further comprises:
- operating the first set of switches to deliver current in the first direction when the inductor current is in the first direction; and
- operating the second set of switches to deliver current in the second direction when the inductor current is in the second direction.

19. The method of claim 18, wherein transitioning between the first operating mode and the second operating mode further comprises:
- opening the second set of switches when a magnitude of the inductor current in the first direction is greater than a second threshold value; and
- opening the first set of switches when a magnitude of the inductor current in the second direction is greater than the second threshold value.

20. The method of claim 19, further comprising:
- delivering current from the first conversion module in accordance with the first operating mode when a magnitude of the inductor current in the first direction is greater than the second threshold value; and
- delivering current from the first conversion module in accordance with the second operating mode when a magnitude of the inductor current in the second direction is greater than the second threshold value.

* * * * *